United States Patent [19]
Leblans et al.

[11] Patent Number: 5,624,603
[45] Date of Patent: Apr. 29, 1997

[54] BARIUMFLUOROHALIDE PHOSPHOR COMPRISING CALCIUM IONS AT THE SURFACE

[75] Inventors: Paul Leblans; Lodewijk Neyens, both of Kontich, Belgium

[73] Assignee: AGFA-Gevaert, N.V., Mortsel, Belgium

[21] Appl. No.: 622,604

[22] Filed: Mar. 26, 1996

[30] Foreign Application Priority Data

Apr. 3, 1995 [EP] European Pat. Off. .............. 95200833

[51] Int. Cl.$^6$ .............................. C09K 11/61; G03C 1/675
[52] U.S. Cl. ............................. 252/301.4 H; 252/301.4 R; 430/21; 430/139; 430/966; 430/945; 250/459.1
[58] Field of Search .................... 252/301.4 R, 301.4 H; 430/21, 139, 966, 945; 250/459.1

[56] References Cited

U.S. PATENT DOCUMENTS

| | | | |
|---|---|---|---|
| 5,543,080 | 8/1996 | Iwase et al. | 252/301.4 H |
| 5,547,807 | 8/1996 | Leblans et al. | 252/301.4 H |

*Primary Examiner*—Melissa Bonner
*Attorney, Agent, or Firm*—Breiner & Breiner

[57] ABSTRACT

A stimulable phosphor panel is provided comprising a bariumfluorohalide phosphor characterized in that in said phosphor at least 1 mole % of the Ba-ions are replaced by Ca-ions and at least 10% of the total amount of Ca-ions are located closely to the surface of the phosphor particles.

A method for producing said phosphor is also provided. The use of said phosphor in a method for recording and reproducing a radiation image is disclosed.

11 Claims, No Drawings

BARIUMFLUOROHALIDE PHOSPHOR COMPRISING CALCIUM IONS AT THE SURFACE

DESCRIPTION

1. Field of the Invention

This invention relates to a photostimulable alkaline earth fluorobromide phosphor especially a phosphor being stimulable with flight with wavelength lower than 600 nm and having improved erasability.

2. Background of the Invention

In a method of recording and reproducing an X-ray pattern disclosed e.g. in U.S. Pat. No. 3,859,527 a special type of phosphor is used, known as a photostimulable phosphor. The phosphor is incorporated in a panel is exposed to incident pattern-wise modulated X-rays and as a result thereof temporarily stores therein energy contained in the X-ray radiation pattern. At some interval after the exposure, a beam of light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

As described in U.S. Pat. No. 4,239,968 europium-doped barium fluorohalides are particularly useful for application as stimulable phosphors for their high sensitivity to stimulating light of a He-Ne laser beam (633 nm), ruby laser beam (694 nm). The light emitted on stimulation, called stimulated light is situated in the wavelength range of 350 to 450 nm with its main peak at 390 nm (ref. the periodical Radiology, September 1983, p. 834).

Most of the phosphor plates are stimulated by laser light with wavelength longer than 600 nm. It can be beneficial to have the possibility to stimulate the storage phosphor with light of lower wavelengths. Phosphors that can be stimulated with light of wavelengths below 600 nm have the advantage that the dark-decay of the stored energy is lower. This means that the user does not have to read the phosphor plate as fast as possible after the exposure, but that instead further exposures on other plates can be made before the reading of all the plates, without the risk that information on the first plate will be lost or will be more difficult to retrieve. Apparatus for reading phosphor plates using laser sources emitting light of wavelengths below 600 nm, can be built smaller, since relatively high power lasers emitting light of wavelength below 600 nm, are smaller than high power lasers emitting light of wavelength above 600 nm.

Phosphor compositions have been formulated showing a stimulation spectrum in which the emission intensity at the stimulation wavelength of 550 nm is higher than the emission intensity at the stimulation wavelength of 650 nm. A suitable phosphor for said purpose is described in U.S. Pat. No. 4,535,237 in the form of a divalent europium activated barium fluorobromide phosphor having the bromine-containing portion stoichiometrically in excess of the fluorine.

A photostimulable phosphor has been disclosed wherein the energy stored in said phosphor can be freed efficiently, as fluorescent light, by photostimulation with light in a wavelength range below 550 nm, so that light of an argon ion laser corresponding with its main emission lines of 514 and 488 nm and frequency doubled light (532 nm) of a solid state Nd:YAG laser originally emitting at 1064 nm can be more efficiently used in photostimulation than He-Ne laser light of 633 nm. It has been disclosed that said phosphors could even be photostimulated with light of He-Cd laser emitting at 442 nm.

The last mentioned stimulable phosphor is within the scope of the following empirical formula:

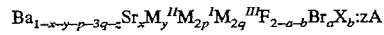

wherein:

X is at least one halogen selected from the group consisting of Cl and I.

$M^I$ is at least one alkali metal selected from the group consisting of Li, Na, K, Rb and Cs;

$M^{II}$ is at least one alkaline earth metal selected from the group consisting of Ca and Mg;

$M^{III}$ is at least one metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;

a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;

y is in the range $0 \leq y \leq 0.10$;

b is in the range $0 \leq b < 0.15$;

p is in the range $0 < p \leq 0.3$;

q is in the range $0 \leq q \leq 0.1$;

z is in the range $10^{-6} \leq z \leq 10^{-2}$, and

A is $Eu^{2+}$.

The main drawback of stimulation by lasers emitting light of shorter wavelengths, is the difficulty of reaching sufficient erasure depth in a short time. As described in Radiology, September 1983, p. 834, the imaging plate containing the stimulable phosphor can be used repeatedly to store X-ray images simply by flooding it with light to erase the residual energy it contains. This erasure of residual energy has to proceed both very rapidly (the imaging plate has to be rapidly available for repeated use) and very thoroughly because the imaging plate can not carry so called "ghost images" of the previous exposure when used for a new exposure.

The slow erasure of all remaining stored energy from phosphors, being stimulable with light of lower wavelength, has hitherto prevented the use of short stimulation wavelengths, in spite of the advantages outlined above.

OBJECTS AND SUMMARY OF THE INVENTION

It is an object of the invention to provide a stimulable phosphor panel (supported as well as self-supporting) that can be stimulated with light having wavelengths shorter than 600 nm and that can repeatedly be used without "ghost-images".

It is a further object of the invention to provide a method for producing stimulable phosphors that can be used in stimulable phosphor panels and that can be stimulated with light having wavelengths shorter than 600 nm and that can repeatedly be used without "ghost-images".

Further objects and advantages of the invention will become clear from the detailed description hereinafter.

The objects of the invention are realised by providing a stimulable phosphor panel comprising a bariumfluorohalide phosphor characterised in that in said phosphor at least 1 mole % of the Ba ions are replaced by Ca-ions and at least 10% of said Ca-ions are located closely to the surface of the phosphor particles.

In a preferred embodiment the phosphor corresponds to the general formula I:

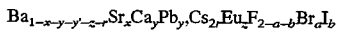
$$Ba_{1-x-y-y'-z-r}Sr_xCa_yPb_{y'}Cs_{2z}Eu_rF_{2-a-b}Br_aI_b \quad \text{I}$$

wherein $0 \leq x \leq 0.30$, $0.01 \leq y < 0.1$, $0 \leq y' \leq 10^{-3}$, $10^{-7} < z < 0.15$, $0 \leq r < 0.05$, $0.75 \leq a+b \leq 1.00$ and $0.02 < b < 0.20$ In a preferred embodiment the phosphor corresponds to the general formula:

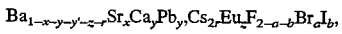
$$Ba_{1-x-y-y'-z-r}Sr_xCa_yPb_{y'}Cs_{2z}Eu_rF_{2-a-b}Br_aI_b, \quad \text{II}$$

wherein $0 < x \leq 0.30$, $0.01 < y < 0.10$, $3.10^{-5} < y' < 3.10^{-4}$, $10^{-7} < z < 0.15$, $0 \leq r < 0.05$, $0.75 \leq a+b \leq 1.00$, and $0.02 < b < 0.20$.

In a most preferred embodiment the phosphor corresponds to general formula II, wherein $0.02 \leq y \leq 0.06$

DETAILED DESCRIPTION OF THE INVENTION

During the further investigation it was surprisingly found that further replacement of barium ions, already partially replaced by strontium ions, provided stimulable phosphors that were still well suited for stimulation at wavelengths lower than 600 nm, but that were better erasable. The best results were obtained when the further replacement of barium ions proceeded either by calcium ions alone or by calcium ions and lead ions.

It was found that a phosphor corresponding to the general formula I:

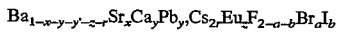
$$Ba_{1-x-y-y'-z-r}Sr_xCa_yPb_{y'}Cs_{2z}Eu_rF_{2-a-b}Br_aI_b \quad \text{I}$$

wherein $0 \leq x \leq 0.30$, $0.01 \leq y < 0.1$, $0 \leq y' \leq 10^{-3}$, $10^{-7} < z < 0.15$, $0 \leq r < 0.05$, $0.75 \leq a+b \leq 1.00$ and $0.02 < b < 0.20$, gave a very acceptable speed when stimulated with light having a wavelength below 600 nm and that the residual energy contained in such a phosphor could be erased easily.

It was further found that, when using a phosphor corresponding to the general formula II:

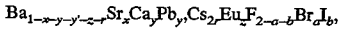
$$Ba_{1-x-y-y'-z-r}Sr_xCa_yPb_{y'}Cs_{2z}Eu_rF_{2-a-b}Br_aI_b, \quad \text{II}$$

wherein $0 < x \leq 0.30$, $0.01 < y < 0.10$, $3.10^{-5} < y' < 3.10^{-4}$, $10^{-7} < z < 0.15$, $0 \leq r < 0.05$, $0.75 \leq a+b \leq 1.00$, and $0.02 < b < 0.20$, i.e. a bariumfluorohalide phosphor wherein some of the Ba ions are replaced by Sr, Ca, Pb and Cs, high speed was achieved when stimulating said phosphor with light having a wavelength below 600 nm. The residual energy contained in said phosphor could be erased even more easily.

When the Ca-ions were located close to the surface of the phosphor particles, corresponding to general formula II, the speed, when stimulating said phosphor with light having a wavelength below 600 nm, was not diminished, but the residual energy could be erased still better and faster.

In the most preferred embodiment, the amount of Ca-ions is between 2 and 6 mole percent, i.e. formula II with $0.02 \leq y \leq 0.06$. It is not necessary that all Ca-ions are located close to the surface of the phosphor particles. Also when at least 10% of the total amount of Ca-ions, preferably at least 25% of the total amount of Ca-ions are located in the vicinity of the surface of said phosphor particles, good speed combined with high erasability is achieved.

The location of the Ca-ions close to the surface of the phosphor particles is achieved by including at least two firing steps in the phosphor production and adding the Ca-ions containing precursors in the last firing step. The method for preparation of the phosphor comprises the steps of:

(i) intimately mixing phosphor precursors, with at most 90%, preferably at most 75% of the total amount of the Ca-ions containing precursors, to have a raw mix (ii) firing said raw mix to obtain a phosphor, (iii) cooling said fired raw mix, recovering said phosphor and grinding it, (iv) optionally adding further phosphor precursors to said ground phosphor and repeating steps (ii) and (iii), (v) optionally repeating step (iv) one or more times and (vi) in a last firing step, before recovering the final phosphor, firing said ground phosphor in the presence of Ca-ions containing phosphor precursors.

Between steps (iii) and (iv) it is possible, if desired, to mix other ion containing precursors to the phosphor recovered in step (iii) and firing said mixture, cooling, grinding it (this is step (iv) mentioned above). Said step (iv) may optionally be repeated one or more times before finally executing step (vi). The inclusion of optional steps (iv) and (V), makes it possible to provide a phosphor with "layered" crystals, i.e. phosphor crystal having a different composition from the surface to the core.

In a preferred embodiment the Ca-ions containing phosphor precursor is $CaF_2$.

After the final firing and cooling, the sintered block of phosphor is milled into fine phosphor particles. The milling operation continues until phosphor particles with the appropriate average particle size and size distribution is obtained. Optionally, the milled phosphor powder can be classified in separate fraction with a specific particle size distribution. During the preparation of the phosphor any known flux materials can be added to the reaction mixture. Flux materials useful for use in the preparation of the phosphors according to the invention are, e.g., halides, metasilicates of alkali metals or alkaline earth metals. Most preferred are fluxes comprising halides of the alkali metals or alkaline earth metals that are already present in the raw mix. A very useful and preferred method for the preparation of stimulable phosphors according to the present invention can be found in Research Disclosure Volume 358, February 1994 p 93 item 35841, that is incorporated herein by reference.

An other useful method for preparation of stimulable phosphors according to this invention can be found in U.S. Pat. No. 5,154,360.

The phosphor particles for use in the method according to the present invention, are preferably classified. This classification, ensures that the size distribution of the phosphor particles comprises at most 20% by weight, preferably at most 10% by weight, of particles with a diameter lower than 1 µm. The absence of small phosphor particles (phosphor particles with diameter $\leq 1$ µm) has a beneficial effect on the image quality.

For use in the method according to the present invention the phosphor can be present in dispersed form in a binder layer that may be supported or self-supporting and forms a screen or panel.

The binder layer incorporates said phosphor in dispersed form preferably in (a) film forming organic polymer(s), e.g. a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/ styrene) or a copoly(vinyl chloride/vinyl acetate/vinyl alcohol) or mixture thereof.

When a binder is used, it is most preferred to use a minimum amount of binder. The weight ratio of phosphor to binder preferably from 80:20 to 99:1. The ratio by volume of phosphor to binding medium is preferably more than 85/15.

Preferably the binding medium substantially consists of one or more hydrogenated styrene-diene block copolymers, having a saturated rubber block, as rubbery and/or elastomeric polymers as disclosed in WO 94/00531. Particularly suitable thermoplastic rubbers, used as block-copolymeric binders in phosphor screens in accordance with this invention are the KRATON-G rubbers, KRATON being a trade mark name from SHELL.

The coverage of the phosphor is preferably in the range from about 5 to about 250 mg/cm$^2$, most preferably said coverage is between 20 and 175 mg/cm$^2$.

The stimulable phosphor used according to the present invention is preferably protected against the influence of moisture by adhering thereto chemically or physically a hydrophobic or hydrophobizing substance. Suitable substances for said purpose are described e.g. in U.S. Pat. No. 4,138,361.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 mm to 0.5 mm.

When the phosphor according to the present invention is used in combination with a binder to prepare a screen or a panel, the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm$^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a layer containing carbon black or to use a coloured support e.g. a grey or black film support.

The sharpness of panels comprising a bariumfluorohalide phosphor according to the present invention can be enhanced by diminishing the void ratio in the panel (e.g. air entrapped between the phosphor particles and the binder(s). This can be achieved by, e.g. applying a compression procedure to the panel as described in, e.g.. EP-A 102 085 and EP-A 113 656.

The electrostatic properties of the panels can be tuned to the needs at hand by adding polyethyleneoxides to the phosphor layer and or the protective layer. A preferred polyethyleneoxide derivative to fine tune said electrostatic properties corresponds to the formula:

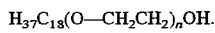

Bariumfluorohalide phosphors according to the present invention, can be used in either supported or selfsupporting stimulable phosphor screens. The stored energy can be stimulated by the light of an HE-Cd laser (442 nm), the light of the main emission lines of an argon laser (488 and 514 nm) and the light of a frequency doubled Nd:YAG laser (532 nm). It is preferred to use light of wavelength between 480 and 550 nm to stimulate stimulable phosphor plates, comprising a phosphor according to the present invention. It is most preferred to use the light of a frequency doubled Nd:YAG laser (532 nm) to stimulate stimulable phosphors according to the present invention.

The panels, comprising a phosphor, according to the present invention, are advantageously used in a radiation image recording and reproducing method comprising the steps of:

i. causing a radiation image storage panel containing a photostimulable phosphor to absorb radiation having passed through an object or having been radiated from an object, ii. exposing said image storage panel to stimulating rays to release the radiation energy stored therein as light emission, the stimulating rays being electromagnetic waves having a wavelength lower than 600 nm iii. detecting the emitted light, iv. erasing the residual stored energy.

Preferably said stimulating rays have a wavelength between 480 nm and 550 nm.

The erasure of the residual stored energy can, with panels comprising a phosphor according to the present invention, proceed in any way known in the art. Ways and means, useful for erasing the residual stored energy of phosphor panels comprising a phosphor according to the present invention, are disclosed in e.g. EP-A 022 564, EP-A 079 791, EP-A 056 599, U.S. Pat. No. 5,065,021, etc. Very useful methods for erasing the residual stored energy of phosphor panels comprising a phosphor according to the present invention, are disclosed in EP-A 598 949 and EP-A 586 744.

The invention is illustrated by the examples and comparative examples given below, without however restricting the invention thereto.

EXAMPLES

Preparation of the Stimulable Phosphors

All stimulable phosphor samples have been prepared in the following way:

The phosphor precursors forming a raw mix, in proportions chosen so as to yield a particular phosphor, were collected in a PE container, and the mix was homogenized for 15 minutes on a jar rolling mill. Next, the powder mix was transferred to a rotating blade mixer (Henschel - Germany) and milled for 5 minutes at 2,000 rpm (rotations per minute) under Ar atmosphere.

Three crucibles containing 130 g of the mix each, were placed in a quartz tube. The quartz tube was sealed with a flange with a water lock at the gas outlet side.

The sealed quartz tube was placed in an oven at 850° C., and the temperature was kept constant at this temperature during the three hour firing. During the firing the tube was flushed with Ar at a rate of 1.5 l/min.

After the firing, the tube was taken out of the furnace and allowed to cool.

After the cooling, the flange was removed and the three crucibles were taken out of the tube.

The powder was milled and homogenized.

A second firing was performed at 750° C., for 6 hours, under a 1.5 l/min 99.8% $N_2$/0.2% $H_2$ gas flow rate.

Finally, the powder was deagglomerated with a pestle and mortar.

The proportions of the phosphor precursors are given under the headings of the specific examples.

Measurements 2.1. Measurement A: Phosphor composition.

Since the cations do not evaporate during the firing, the Ba, Sr, Ca, Cs, Pb and Eu contents of the phosphors were not measured, and it was assumed that the cation ratios were equal to those in the raw mix.

The halides being in molar excess over the non-evaporating cations, evaporate partly during the firing.

The F- and Br-content of the phosphors was determined via ion-chromatography.

Measuring equipment and conditions:

| | |
|---|---|
| ion chromatograph | gic analyser |
| detector | conductivity detector |
| guard columna | AG 3 |
| separator column | AS 3 |
| injection volume | 50 µl |
| detector sensitivity | 100 µs/1000 mV full scale |
| eluence | 2.8 mM $NaHCO_3$:2.2 mM $Na_2CO_3$ |
| eluence flow rate | 2.0 ml/min |
| regenerant | 0.025 N $H_2SO_4$ |
| regenerant flow rate | 3.0 ml/min |
| reference time F | 1.65 min |

Determination of $F^-$

The concentration of the fluoride ions ($F^-$) was determined from the height of the F-peak.

To determine the accuracy of the measuring procedure five 1 ppm NaF standards were prepared:

0.5525 g NaF p.a. (pro analysis quality) was weighed and transferred into a 250 ml volumetric flask. The NaF was dissolved in doubly distilled water and water was added to get a total volume of 250 ml. The solution was first diluted 10-fold with doubly distilled water and then further diluted 100-fold. The five 1 ppm NaF standards were injected and the peak height was measured. The average peak height was 385,068 in arbitrary values and the standard deviation was 914.299. This gave a coefficient of variability (standard deviation divided by the average value) of 0.00237.

To measure the F-concentration in the phosphor samples, 50 mg of each sample was transferred into a test tube and 1 ml of analytically pure HCl (1N) was added followed by the addition of about 10 ml of doubly-distilled water. The tube was then sealed and heated for 5 to 10 min in a boiling water bath. The tube was then cooled in ice and 1 ml of NaOH (1N) was injected. The solution was then poured into a 50 ml volumetric flask and the solution made up to 50 ml with doubly distilled water. Finally, the solution was diluted 50-fold with eluence and injected into the ion-chromatograph.

The correctness of the results obtained with the measuring procedure was tested by applying it three times to a pure $BaF_2$ standard, that theoretically contains 21.7% F. The dilution factor was 100 instead of 50. The average percentage F measured on the pure $BaF_2$ standard was 21.73 with a standard deviation of 0.115. This gave a coefficient of variability (standard deviation divided by the average value) of 0.0053.

The reproducibility of the F-concentration measurement, in a phosphor, was determined by performing the measurement in 5-fold for a standard phosphor. The average percentage F measured on the standard phosphor was 8.14 with a standard deviation of 0.288. This gave a coefficient of variability (standard deviation divided by the average value) of 0.0354.

Determination of $Br^-$

The concentration of the bromide ions ($Br^-$) was determined from the height of the Br-peak.

To determine the accuracy of the measuring procedure for determining the bromide ion content five 5 ppm NaBr standards were prepared as follows:

0.3219 g NaBr p.a. (pro analysis quality) was weighed and transferred into a 250 ml volumetric flask. The NaBr was dissolved in doubly distilled water and diluted up to a total volume of 250 ml. The 1000 ppm solutions were diluted 200-fold with double distilled water and then injected into the ion-chromatograph. The peak height was measured. The average peak height was 200,709 in arbitrary values and the standard deviation was 669.106. This gave a coefficient of variability (standard deviation divided by the average value) of 0.00333.

The reproducibility of the results obtained with the described procedure was determined by performing the measurement 5-fold for a standard phosphor. The average percentage Br measured on the standard phosphor was 32.076 with a standard deviation of 0.180. This gave a coefficient of variability (standard deviation divided by the average value) of 0.0056.

The I-content was determined via XRF (X-ray diffraction).

2.2. Measurement B: Erasure depth

On the phosphor plate a 1 mm thick Funk raster was imaged with a X-ray dose of 6960 µGy at 70 $kV_p$.

The plate was scanned with a frequency doubled Nd:YAG laser (532 nm) in a direction perpendicular to the slits of the Funk raster.

The modulation of the stimulated output signal at 0.025 lp/mm (line pairs/mm) is taken as the image output prior to erasure and designated by $O_0$.

The plate was then erased for 10 sec, in an erasure unit, containing quartz halogen lamps with total power of 4 kW. The UV emission of said quartz halogen lamps (i.e. all emission below 413 nm) was filtered away by the use of a suitable filter.

After the erasure step, the plate was again scanned with a frequency doubled Nd:YAG laser (532 nm) in a direction perpendicular to the slits of the Funk raster.

The modulation of the stimulated output signal at 0.025 lp/mm (line pairs/mm) is taken as the image output after erasure and designated by $O_1$.

The erasure depth (ED) in dB was calculated as $$ED = 10 \times \log(O_0/O_1) \text{ in dB.}$$

Invention Example 1 (IE1) and Non-Invention Example 1 (NIE1)

A raw mix was prepared with the following composition:

| | |
|---|---|
| $BaF_2$: | 0.86 mole |
| $SrF_2$: | 0.14 mole |
| $CaF_2$: | 0.03 mole |
| $NH_4Br$: | 0.994 mole |
| $NH_4I$: | 0.186 mole |
| $EuF_3$: | 0.001 mole |
| CsI: | 0.003 mole. |

For Non-Invention Example 1:
The raw mix, given above was used as such.

For Invention example 1:
The raw mix as in non-invention example 1 was used, but only 0.02 mole of $CaF_2$ was added to the raw mix and before the second firing an additional 0.01 mole of $CaF_2$ was added. After the preparation procedure described above, two phosphor samples were obtained, and an X-ray diffraction (XRD) spectrum did not show $CaF_2$ lines, indicating that in both phosphors the $CaF_2$ is incorporated in the phosphor crystals. The composition of each phosphor was determined according to measurement A.

The Non-Invention phosphor corresponded to the formula:

$$Ba_{0.832}Sr_{0.135}Ca_{0.029}Eu_{0.001}Cs_{0.003}F_{1.49}Br_{0.877}I_{0.83} \quad (NIE1)$$

The Invention phosphor corresponded to the formula $$Ba_{0.824}Sr_{0.134}Ca_{0.030}Eu_{0.001}Cs_{0.003}F_{1.41}Br_{0.869}I_{0.091} \quad (IE1)$$

Both powders were dispersed in a binder solution containing cellulose acetobutyrate dissolved in methyl ethyl ketone. The dispersions obtained were coated onto a 100µ thick transparent sheet of polyethylene terephthalate to give a dry coating weight of about 1,000 g/m².

The erasure depth (ED) was measured according to measurement B. Non-invention phosphor 1 (NIE) had a ED=40.6 dB and Invention phosphor IE1 had an ED=41.8 dB. This indicates that the addition of Ca-ions during the last firing increases the erasure depth.

Invention Example 2 (IE2) and Non-Invention Example 2 (NIE2) and 3 (NIE3)

Two raw mixes were prepared with the following compositions:

For Non-Invention Example 2:

| | |
|---|---|
| $BaF_2$: | 0.86 mole |
| $SrF_2$: | 0.14 mole |
| $NH_4Br$: | 0.994 mole |
| $NH_4I$: | 0.186 mole |
| $EuF_3$: | 0.001 mole |
| CsI: | 0.003 mole. |

For Non-Invention Example 3:

| | |
|---|---|
| $BaF_2$: | 0.82 mole |
| $SrF_2$: | 0.18 mole |
| $NH_4Br$: | 0.82 mole |
| $NH_4I$: | 0.15 mole |
| $EuF_3$: | 0.001 mole |
| CsI: | 0.003 mole. |
| $PbF_2$ | 0.0003 mole |

For Invention Example 2:
The raw mix of non-invention example 2 (NIE2) was used, but in the last firing 0.03 mole of $CaF_2$ was added. In this way the phosphor of invention example 2 (IE2) was prepared.

The synthesis was performed in the way described above. Three phosphor samples were obtained, and an X-ray diffraction (XRD) spectrum did not show $CaF_2$ lines, indicating that in phosphor IE2 the $CaF_2$ is incorporated in the phosphor crystals and thus does not exist as a separate phase.

The compositions of the obtained phosphors were determined in the way described hereinbefore (Measurement A).

The Non-Invention phosphor (NIE2) corresponded to the formula:

$$Ba_{0.857}Sr_{0.139}Eu_{0.001}Cs_{0.003}F_{1.039}Br_{0.859}I_{0.103} \quad (NIE2)$$

The Non-Invention phosphor (NIE3) corresponded to the formula:

$$Ba_{0.8165}Sr_{0.1792}Eu_{0.001}Cs_{0.003}Pb_{0.0003}F_{1.047}Br_{0.855}I_{0.098} \quad (NIE3)$$

The Invention phosphor corresponded to the formula $$Ba_{0.7928}Sr_{0.174}Ca_{0.029}Eu_{0.001}Cs_{0.0029}F_{1.075}Br_{0.83}I_{0.095} \quad (IE2)$$

The powders were dispersed in a binder solution containing cellulose acetobutyrate dissolved in methyl ethyl ketone. The dispersions obtained were coated onto a 100µ thick transparent sheet of polyethylene terephthalate to give a dry coating weight of about 1,000 g/m².

The erasure depth was measured according to measurement B:

| | |
|---|---|
| NIE2 | 41.7 dB |
| NIE3 | 42.8 dB |
| IE2 | 43.7 dB |

Invention Example 3 (IE3) and Non Invention Example 4 (NIE4) and 5 (NIE5)

Two raw mixes were prepared with the following compositions:

For Non-Invention Example 4:

| | |
|---|---|
| $BaF_2$: | 0.86 mole |
| $SrF_2$: | 0.14 mole |
| $NH_4Br$: | 0.994 mole |
| $NH_4I$: | 0.186 mole |
| $CaF_2$ | 0.03 mole |
| $EuF_3$: | 0.001 mole |
| CsI: | 0.003 mole. |

For Non-Invention Example 5:

| | |
|---|---|
| BaF$_2$: | 0.82 mole |
| SrF$_2$: | 0.18 mole |
| CaF$_2$ | 0.03 mole |
| NH$_4$Br: | 0.82 mole |
| NH$_4$I: | 0.15 mole |
| EuF$_3$: | 0.001 mole |
| CsI: | 0.003 mole. |
| PbF$_2$ | 0.0003 mole |

For Invention Example 3:

The raw mix of non-invention example 5 (NIE5) was used, but in the last firing 0.03 mole of CaF$_2$ was added. In this way the phosphor of invention example 3 (IE3) was prepared The synthesis was performed in the way described above. Three phosphor samples were obtained, and an X-ray diffraction (XRD) spectrum did not show CaF$_2$ lines, indicating that in the three phosphors the CaF$_2$ is incorporated in the phosphor and thus does not exist as a separate phase.

The compositions of the obtained phosphors were determined in the way described hereinbefore (Measurement A).

The Non-Invention phosphor (NIE4) corresponded to the formula:

$$Ba_{0.832}Sr_{0.135}Ca_{0.029}Eu_{0.001}Cs_{0.003}F_{1.07}Br_{0.83}I_{0.1} \quad (NIE4)$$

The Non-Invention phosphor (NIE5) corresponded to the formula:

$$Ba_{0.7928}Sr_{0.174}Ca_{0.029}Eu_{0.001}Cs_{0.0029}Pb_{0.0003}F_{1.099}Br_{0.819}I_{0.082}$$

The Invention phosphor IE3 corresponded to the formula $$Ba_{0.7705}Sr_{0.1691}Ca_{0.0564}Eu_{0.0009}Cs_{0.0028}Pb_{0.0003}F_{1.125}Br_{0.795}I_{0.08}$$

The powders were dispersed in a binder solution containing cellulose acetobutyrate dissolved in methyl ethyl ketone. The dispersions obtained were coated onto a 100µ thick transparent sheet of polyethylene terephthalate to give a dry coating weight of about 1,000 g/m$^2$.

The erasure depth was measured according to measurement B:

| | |
|---|---|
| NIE4 | 40.1 dB |
| NIE5 | 41.5 dB |
| IE2 | 43.0 dB |

We claim:

1. A stimulable phosphor panel comprising a bariumfluorohalide phosphor characterised in that in said phosphor at least 1 mole % of the Ba-ions are replaced by Ca-ions and at least 10% of the total amount of Ca-ions are located closely to the surface of said phosphor particles.

2. A stimulable phosphor panel according to claim 1, wherein said phosphor corresponds to general formula I:

$$Ba_{1-x-y-y'-z-r}Sr_xCa_yPb_{y'}Cs_zEu_rF_{2-a-b}Br_aI_b, \quad I$$

wherein $0 \leq x \leq 0.30$, $0.01 \leq y < 0.1$, $0 \leq y' \leq 10^{-3}$, $10^{-7} < z < 0.15$, $0 \leq r < 0.05$, $0.75 \leq a+b \leq 1.00$ and $0.02 < b < 0.20$.

3. A stimulable phosphor panel according to claim 1, wherein said phosphor corresponds to general formula II:

$$Ba_{1-x-y-y'-z-r}Sr_xCa_yPb_{y'}Cs_zEu_rF_{2-a-b}Br_aI_b, \quad II$$

wherein $0 < x \leq 0.30$, $0.01 < y < 0.1$, $3 \cdot 10^{-5} < y' < 3 \cdot 10^{-4}$, $10^{-7} < z < 0.15$, $0 \leq r < 0.05$, $0.75 \leq a+b \leq 1.00$, and $0.02 < b < 0.20$.

4. A stimulable phosphor panel according to claim 3, wherein $0.02 \leq y \leq 0.06$.

5. A stimulable phosphor panel according to claim 1, wherein at least 25% of the total amount of Ca-ions is located closely to the surface of said phosphor particles.

6. A method for preparation of a bariumfluorohalide phosphor comprising the steps of:
   (i) intimately mixing the phosphor precursors, with at most 90% of the total amount of the Ca-ions containing precursors, to have a raw mix,
   (ii) firing said raw-mix,
   (iii) cooling said fired raw-mix, recovering the phosphor and grinding it,
   (iv) optionally adding further phosphor precursors to said ground phosphor and repeating steps (ii) and (iii),
   (v) optionally repeating step (iv) one or more times and
   (vi) in a last firing step, before recovering the final phosphor, firing said ground phosphor in the presence of Ca-ions containing phosphor precursors.

7. A method according to claim 6, wherein in step (i) at most 75% of the total amount of Ca-ions are added to the raw mix.

8. A radiation image recording and reproducing method comprising the steps of:
   i. causing a radiation image storage panel containing a photostimulable phosphor to absorb radiation having passed through an object or having been radiated from an object,
   ii. exposing said image storage panel to stimulating rays to release the radiation energy stored therein as light emission, the stimulating rays being electromagnetic waves having a wavelength lower than 600 nm
   iii. detecting the emitted light and
   iv. erasing the residual stored energy,
characterised in that said photostimulable phosphor is a bariumfluorohalide phosphor wherein at least 1 mole % of the Ba-ions are replaced by Ca-ions and wherein at least 10% of the total amount of Ca-ions are located closely to the surface of the phosphor particles.

9. A method according to claim 8, wherein said phosphor corresponds to general formula I:

$$Ba_{1-x-y-y'-z-r}Sr_xCa_yPb_{y'}Cs_zEu_rF_{2-a-b}Br_aI_b, \quad I$$

wherein $0 \leq x \leq 0.30$, $0.01 \leq y < 0.1$, $0 \leq y' \leq 10^{-3}$, $10^{-7} < z < 0.15$, $0 \leq r < 0.05$, $0.75 \leq a+b \leq 1.00$ and $0.02 < b < 0.20$.

10. A method according to claim 8, wherein said phosphor corresponds to general formula II:

$$Ba_{1-x-y-y'-z-r}Sr_xCa_yPb_{y'}Cs_zEu_rF_{2-a-b}Br_aI_b, \quad II$$

wherein $0 < x \leq 0.30$, $0.01 < y < 0.1$, $3 \cdot 10^{-5} < y' < 3 \cdot 10^{-4}$, $10^{-7} < z < 0.15$, $0 \leq r < 0.05$, $0.75 \leq a+b \leq 1.00$, and $0.02 < b < 0.20$.

11. A method according to claim 8, wherein said stimulating rays are produced by a frequency doubled Nd:YAG laser.

* * * * *